UNITED STATES PATENT OFFICE.

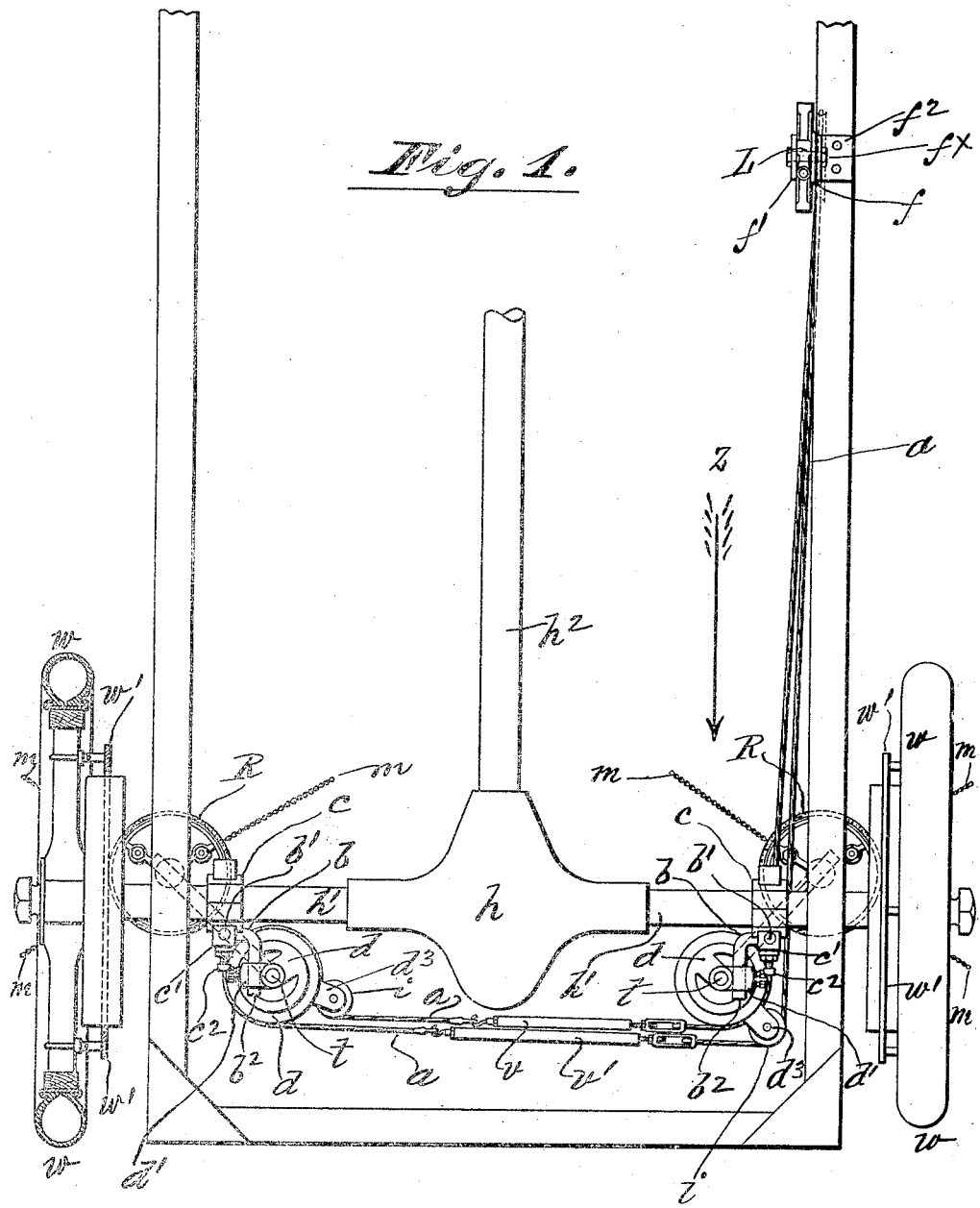

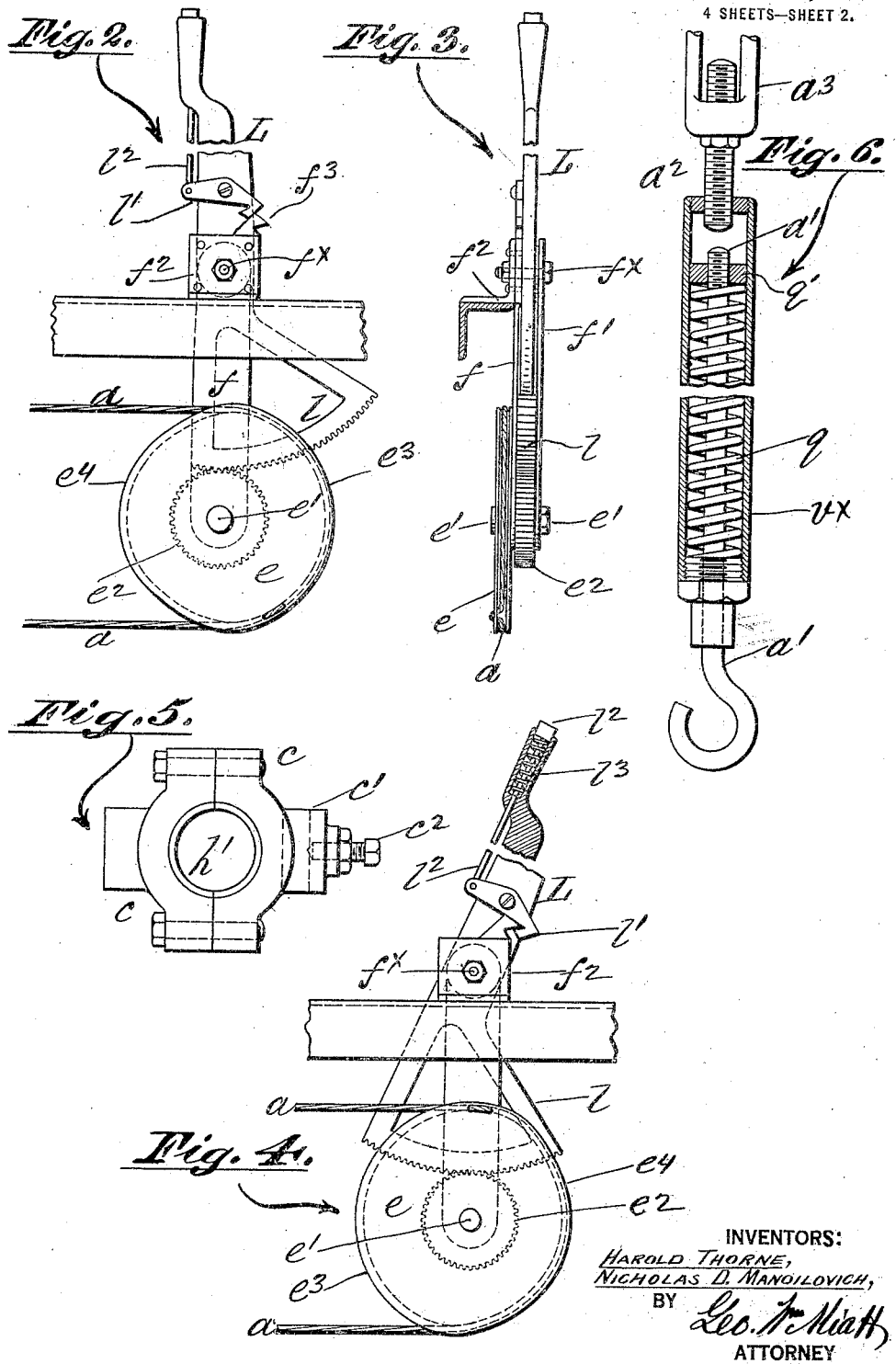

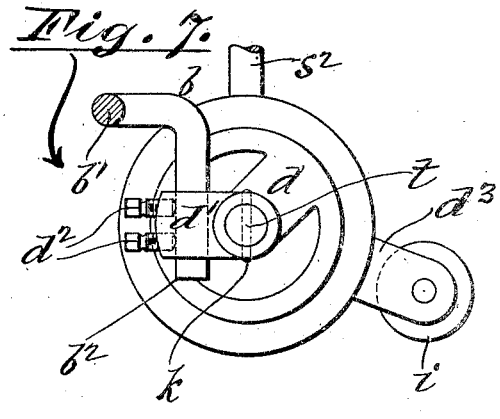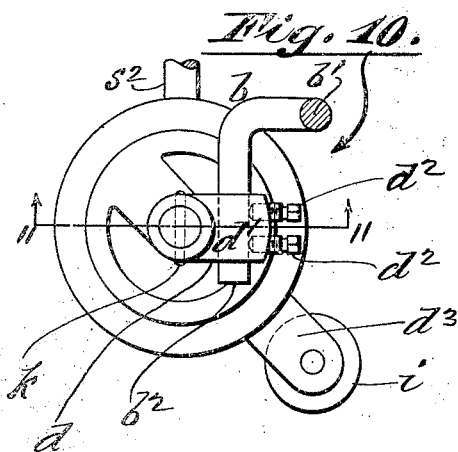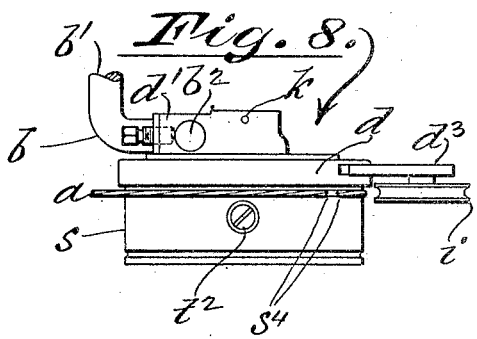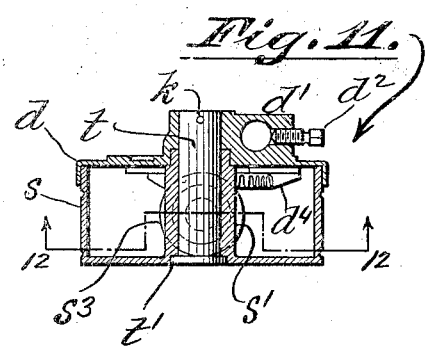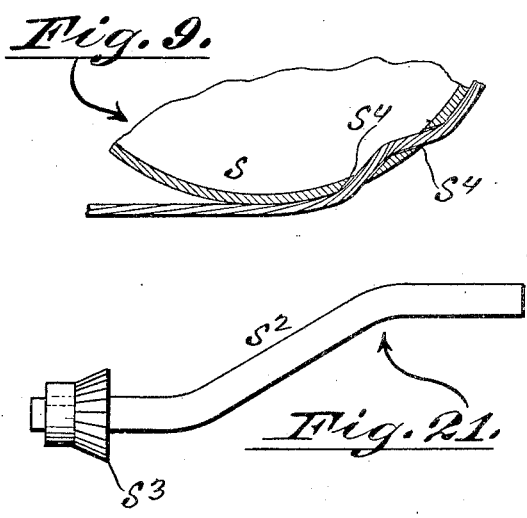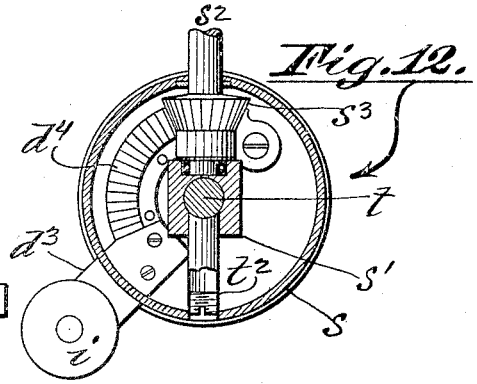

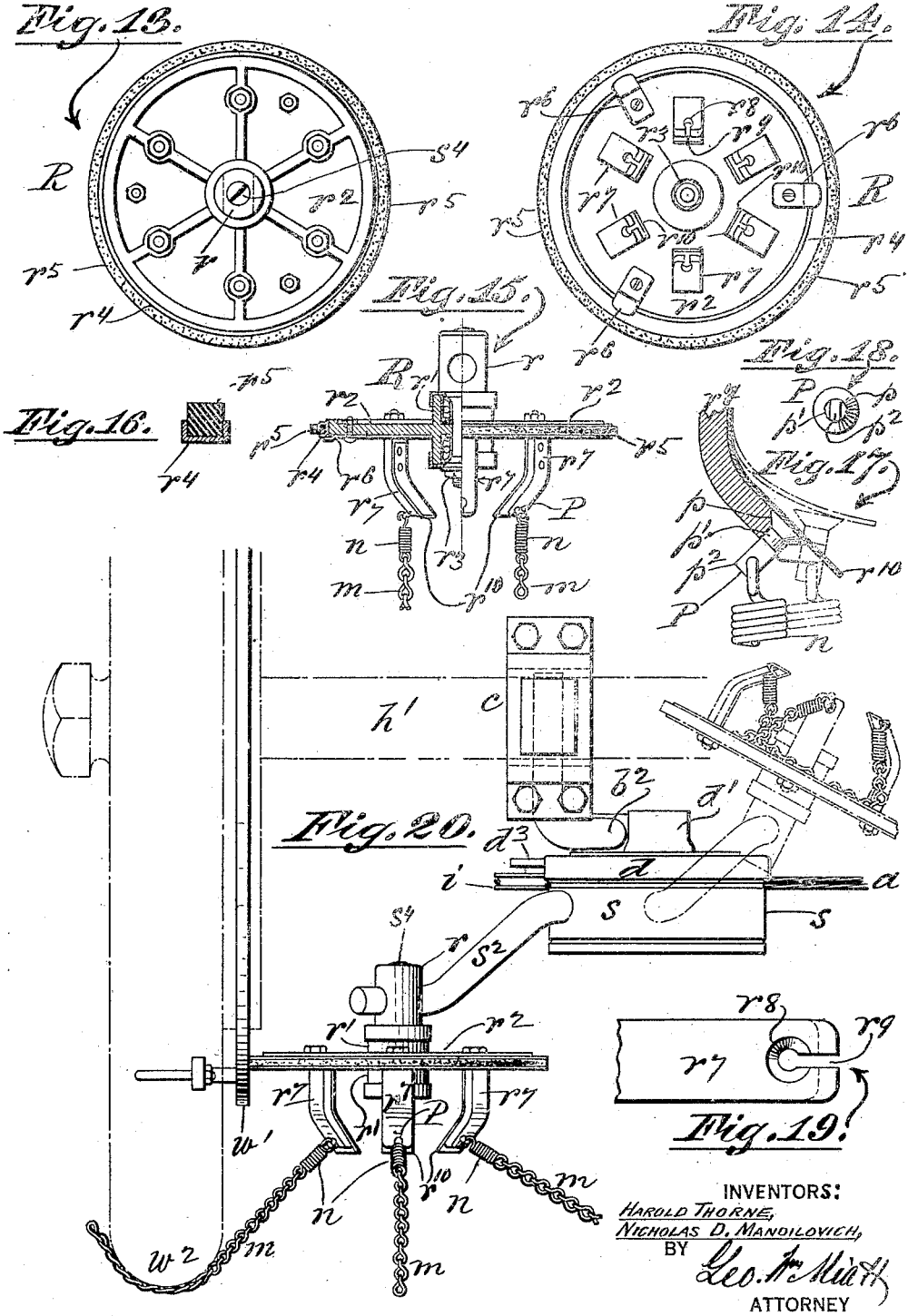

HAROLD THORNE, OF NEW YORK, AND NICHOLAS D. MANOILOVICH, OF ASTORIA, NEW YORK; SAID MANOILOVICH ASSIGNOR TO SAID THORNE.

ANTISKID DEVICE FOR AUTOMOBILES, &c.

1,374,252. Specification of Letters Patent. Patented Apr. 12, 1921.

Application filed December 19, 1919. Serial No. 346,024.

*To all whom it may concern:*

Be it known that we, HAROLD THORNE, a subject of the King of Great Britain, and a resident of the borough of Manhattan, city, county, and State of New York, and NICHOLAS D. MANOILOVICH, a subject of the King of Great Britain, and a resident of Astoria, county of Queens, and State of New York, have invented certain new and useful Improvements in Antiskid Devices for Automobiles, &c., of which the following is a specification.

Our invention relates to means for counteracting the tendency of wheel tires to "skid" or slip laterally, particularly those used on automobile wheels,—our object being primarily to afford an effective substitute for the anti-skid tire chains heretofore extensively used for the purpose, the application of which in emergency involves the expenditure of considerable time and labor, usually under adverse circumstances, and under conditions not ordinarily agreeable, convenient, or clean.

Our improvements are applicable more particularly to the type of anti-skid device shown in Letters Patent No. 1,236,499, and No. 1,236,500, issued to Harold Thorne, August 14, 1917, in which provision is made for the use of flexible frictional deterrent means which, when necessary, may be interposed by centrifugal force between the tread of a wheel and the surface with which it contacts, thereby increasing attritive resistance and counteracting any tendency of the wheel to yield transversely to its plane of rotation, the said patents also showing means for effecting the retraction of such anti-skid device when not desired for actual use, and for the support thereof out of danger of contact with objects lying on the road traversed by the vehicle,—our present invention being the result of experimental investigation undertaken for the purpose of perfecting and standardizing such apparatus to meet the various exigencies of use upon all kinds of roads, etc., while at the same time simplifying both construction and operation, all as hereinafter more fully set forth.

In the accompanying drawings,

Figure 1, is a plan of the rear portion of a chassis frame of an automobile, showing also the housing, etc., for the rear or drive shaft of the vehicle, with the left hand wheel in partial section;

Fig. 2, is an elevation of the control lever, etc., as positioned when the anti-skid rotors are lowered for use;

Fig. 3, is an elevation taken at right angles to Fig. 2;

Fig. 4, is a view similar to Fig. 2, showing the parts as positioned when the anti-skid rotors are retracted;

Fig. 5, is a detail elevation of one of the clip collars used on the casing of the drive shaft for the support of the rotor-switch drums;

Fig. 6, is a sectional elevation of one of the tension springs;

Fig. 7, is a plan of the left hand rotor-switch drum;

Fig. 8, is an elevation of the same taken at right angles to Fig. 7;

Fig. 9, is a detail view showing the means of cable connection with the rotor-switch drums;

Fig. 10, is a plan of the right hand rotor-switch drum;

Fig. 11, is a sectional elevation taken upon plane of line 11—11, Fig. 10;

Fig. 12, is a sectional elevation taken upon plane of line 12—12, Fig. 11;

Fig. 13, is a plan of one of the anti-skid rotors;

Fig. 14, is a view of the under side thereof;

Fig. 15, is a sectional elevation of one of the anti-skid rotors;

Fig. 16, is a sectional detail of one of the replacement rims as used on said rotors;

Fig. 17, is a sectional detail showing the coupling means for detachably securing a frictional deterrent to a rotor;

Fig. 18, is an end elevation of one of the coupling pins;

Fig. 19, is a top view of the outer end of one of the rotor arms; and

Fig. 20, is an elevation showing the right hand anti-skid rotor, its annular tread, and rotor-switch drum, as correlated to each other and to the wheel and rear axle casing, the view being taken in the direction of the arrow z, Fig. 1, looking toward the rear of the chassis;

Fig. 21 is a detail view of one of the rock switch arms.

While applicable to the wheels of vehicles of various kinds, our improved anti-skid apparatus is designed especially for use in connection with the drive wheels, $w$, $w$, of automobiles, and is herein shown and described as utilized in conjunction therewith, the anti-skid rotors and connections being represented as mounted and supported mainly on the rear-shaft housing (as shown in Fig. 1) consisting of the differential casing $h$, shaft sleeves $h'$, $h'$, and power shaft sleeve $h^2$.

$c$, $c$, are split clip collars rigidly clamped upon the shaft sleeves $h'$ $h'$, one adjacent to each wheel $w$, $w$. These clip collars $c$, $c$, constitute means of attachment and support for the bracket arms $b$, $b$, the vertical members $b'$, $b'$, of which are rigidly clamped in the collar sockets $c'$, $c'$, by means of screws $c^2$, $c^2$, as shown in Fig. 1, reference being made also to Fig. 5, which shows one of the clip collars on a larger scale.

The horizontal members $b^2$, $b^2$, of the bracket arms $b$, $b$, extend rearward from the clip collars $c$, $c$, and axle sleeves $h'$, $h'$, and afford support for the rotor switch drum-plates $d$, $d$, which are formed with sockets $d'$, $d'$, for the reception of the said horizontal members $b^2$, $b^2$, of the bracket arms $b$, $b$, and provided with clamping screws $d^2$, $d^2$, by means of which the said drum-plates $d$, $d$, are rigidly secured to said bracket arms. From the foregoing it will be seen that the clip collars $c$, $c$, bracket arms $b$, $b$, and drum-plates $d$, $d$, are all rigidly positioned upon the shaft sleeves $h'$, $h'$, and are stationary as related thereto.

Each rotor switch drum-plate $d$, $d$, besides the rigid socket member $d'$, is also formed with a rigid bracket $d^3$, radially protuberant from the right posterior sides thereof, as will be understood by reference more particularly to Figs. 1, 7 and 10, of the drawings, by which it will be seen that the bracket $d^3$, of the right hand rotor drum plate $d$ (as viewed from above the rear of the chassis) protrudes rearward farther than the corresponding bracket $d^3$, on the left hand rotor drum plate. Hence, the twin idler rolers $i$, $i$, mounted on said posterior brackets $d^3$, $d^3$, are out of alinement as related to each other sufficiently to afford clearance for the parallel rear strands of the rotor drum actuating cable $a$, as shown in Fig. 1.

The under side of each rotor drum-plate $d$, is formed with a segmental gear rack $d^4$, concentric with the axial support $t$, of the rotor switch drum $s$, as shown more particularly in Fig. 12, in which the parts are represented as turned over and upward from right to left as related to Figs. 10 and 11. The said axial support $t$, for the rotor switch drum $s$, consists in each case of a suspender trunnion, the upper portion of which is keyed as at $k$, to the drum plate $d$, as indicated in Figs. 7, 8, 10 and 11,—the lower extremity of each suspender trunnion being formed with a drum-retaining shoulder $t'$, shown in Fig. 11,—the switch drum $s$, being freely rotatable upon said spindle or suspender trunnion $t$, $t'$. $t^2$, Fig. 12, is a grease tube for the lubrication of the opposed surfaces of the said trunnion $t$, and the central sleeve $s'$, of said rotatable drum $s$.

$s^2$, is the rock switch arm on the outer end of which the rotor R, is rigidly mounted, the inner end of said rock switch arm $s^2$, being journaled in and between the trunnion sleeve $s'$, and the drum wall as shown in Fig. 12, and having rigidly secured to it between said journal bearings a gear $s^3$, which meshes with the segmental gear rack $d^4$, on the under side of the drum plate $d$.

Each switch drum $s$, is positively attached to the actuating cable $a$, by any suitable means so as to be capable of partial rotation thereby. As shown in Fig. 9, of the drawings this is effected by passing the actuating cable $a$, through slits $s^4$, $s^4$, formed for the purpose in the wall of the switch drum $s$, although we do not confine ourselves to this method of attaining a connection between drum and cable.

Each rock switch arm $s^2$, is of sufficient length to support its rotor R, in operative juxtaposition to its particular drive wheel $w$, as shown particularly in Fig. 20, in solid lines, in which view the retracted position of the rotor R, is indicated in dotted lines,—the operative positioning of the rotor R, and the retraction thereof, being in each case effected by the partial rotation of the switch drum $s$, operating through the medium of the rack $d^4$, and gear $s^3$, under control of the actuating cable $a$. That is to say, the partial rotation of the drum $d$, not only moves the rotor R, toward or from its drive wheel $w$, but also lowers or raises it simultaneously by imparting approximately a half rotation to the rock switch arm $s^2$, the result being indicated by the two positions of the rotor R, shown in Fig. 20, as aforesaid.

The movement of the actuating cable $a$, to effect this partial rotation of the switch drums $s$, is attained by means of the partial rotation of an eccentric disk $e$, to the periphery of which the forward bight of said actuating cable $a$, is secured, as shown in Figs. 2, 3 and 4,—said eccentric disk being rigidly secured to a short axle shaft $e'$, mounted in bearings in the lower extremities of fixed suspender arms or brackets $f$, $f'$, a pinion $e^2$, being also rigidly secured to said axle shaft $e'$, between said suspenders $f$, $f'$,— said pinion $e^2$, meshing with a segmental gear $l$, on the lower extremity of a control lever L, fulcrumed upon a bracket $f^2$, rigidly secured to the chassis frame F. In the construction shown in the drawings the suspender arm $f$, is bolted rigidly to the bracket $f^2$, and the suspender arm $f'$, is held in parallelism to the arm $f$, by the fulcrum bolt $f^x$, above, and the axle shaft $e'$, below,—the said fulcrum bolt $f^x$, being that on which the lever L, is supported.

It is to be understood of course that the rotors R, their switch drums $d$, and appurtenances are essentially duplicated for each wheel $w$, $w$, except as necessarily modified by their reversal in positions as related to each other and to the right and left hand wheels $w$, $w$, which they respectively serve, so that the description thereof herein is otherwise applicable to both wheel anti-skid sets.

Thus, each rotor R, comprises a hub spindle $r$, which is rigidly mounted (as by a set screw $s^4$) on the outer extremity of a rock switch arm $s^2$, and affords support for the hub $r'$, of a frictional rotor disk $r^2$, the periphery of which, when in action, contacts with an annular track $w'$, rigidly mounted for the purpose on the inner side of the drive wheel $w$, as shown more particularly on the left hand side of Fig. 1. The hub $r'$, of the rotor disk $r^2$, may be furnished with anti-friction means as indicated in Fig. 15, and held in place by a nut $r^3$, screwing upon the threaded end of the hub spindle $r$, as in said Fig. 15, or by any equivalent mechanical expedient. The rotor disk $r^2$, is provided with a detachable rim $r^4$, having a rubber or other relatively soft tread $r^5$, for frictional contact with the aforesaid annular track $w'$, on the wheel $w$. A cross section of such a detachable rim $r^4$, is shown in Fig. 16, and in Fig. 15, the rim is shown as secured between a peripheral flange on the rotor disk $r^2$, and clamp plates $r^6$, $r^6$, bolted to the said disk $r^2$, although we do not confine ourselves to details of construction in this respect, the essential feature being the provision of a detachable replacement rim having a relatively soft tread for frictional contact with the annular track $w'$, on the drive wheel $w$. By thus providing for the replacement of rim and tread whenever desirable we are able to maintain the requisite frictional contact with the annular track $w'$, of the wheel, and prolong the utilizable life of the rotor. Another important function attained by our independent detachable rim $r^4$, $r^5$, arises from the fact that it is not rigidly secured to the rotor disk $r^2$, so that in case the latter is subject to undue retardatory strain by the deterrents $m$, the said rim $r^4$, $r^5$, can slip in its peripheral seat on the rotor disk $r^2$, and thus obviate danger that might otherwise arise from excessive frictional resistance.

Rigidly secured to each rotor disk $r^2$, is a series of equi-distant deterrent supports $r^7$, arranged concentrically as related to the hub $r'$, as shown more particularly in Figs. 13 and 14. At its outer extremity each deterrent support $r^7$, is formed with a countersunk socket $r^8$, having a contracted entrance slot $r^9$, shown clearly in Fig. 19. Each deterrent support $r^7$, is also provided with a flat spring $r^{10}$, the free end of which normally covers and closes the countersunk socket $r^8$. P, are coupling pins formed with heads $p$, and necks $p'$, fitting in any of the countersunk sockets $r^8$, of the deterrent posts or supports $r^7$,—the portions $p^2$, of the shanks of the coupling pins P, beyond the neck portions $p'$, being of reduced thickness and adapted to be passed through the entrance slots $r^9$, of the aforesaid countersunk sockets $r^8$. Thus, when the free end of a spring $r^{10}$, is deflected sufficiently, as indicated in dotted lines in Fig. 17, the flat narrow portion $p^2$, of the shank of a coupling pin P, may be passed through an entrance slot $r^9$, and the head $p$, and neck $p'$, of the pin P, seated in a socket $r^8$, as shown in solid lines in said Fig. 17. By this means the coupling pins P, are positively but detachably secured in position on the ends of the deterrent posts or supports $r^7$,—the springs $r^{10}$, normally locking the heads $p$, and necks $p'$, of the said coupling pins P, within the sockets $r^8$. By this construction and arrangement of parts the coupling pins P, are also essentially swivel connections between the deterrent posts $r^7$, and the flexible deterrents themselves, since the pins P, are free to rotate on their longitudinal axes and thus adapt themselves to any torsional strain exerted upon them. In other words they conform axially to the "pull" of the flexible deterrents.

The flexible deterrents each consist of a frictional tread section $m$, linked to a pin P, by means of a coiled spring $n$, said spring link $n$, compensating for any excess of strain imparted to the frictional tread section $m$, and thus protecting the latter and the supporting posts $r^7$, against fracture, while at the same time tending constantly to maintain the tread section $m$, in proper relationship to the tread of the wheel with which it coöperates. The frictional tread sections $m$, are represented as consisting each of a suitable length of metallic chain, which on account of its strength, flexibility, and coarse and rugged character, is especially suited for the purpose, although we do not confine ourselves to the use of such material because various equivalents and mechanical expedients may be substituted with like result,—the essential feature in this respect being a suitable length of appropriate material articularly connected at one end to the rotor disk $r^2$, in such manner as to be free to conform to centrifugal force,—the latter, when sufficient speed of rotation is imparted to the rotor R, spreading the said deterrents $m, m$, radially and tangentially in such manner as to project them successively into the path of the tread $w^2$, of the wheel $w$, thereby increasing frictional resistance between the tread $t$, and the surface over which the wheel is traveling, and thus counteracting any tendency of the tread to "skid" or slip laterally on the road.

In order to hold the rotor disks $r^2$, $r^2$, firmly against the annular tracks $w'$, $w'$, by elastic resilient pressure, we interpose tension devices $v$, $v'$, in the rear strands of the actuating cable $a$, as shown in Fig. 1, one of these devices being shown in sectional detail in Fig. 6, although we do not limit ourselves to this particular form of tension device in this connection, the essential feature being the use of elastic resilient media in said rear strands of the actuating cable $a$, in such manner that the cable is held taut under all conditions, and so that the tension thereon may be varied by extending or contracting its length by means of the eccentric disk $e$. Thus, when the disk $e$, is rotated by the lever L, acting through the medium of the segment $l$, and pinion $e^2$, into the position shown in Fig. 2, with the arc $e^3$, of greater radial length to the fore, it is obvious that the difference between such radial length and that of the lesser arc $e^4$, of the disk $e$, will be compensated for by said tension devices $v$, $v'$. It is also obvious that by this means the switch drums $s$, $s$, may be made to impart greater pressure to the rotors R, when the latter are lowered into operative relation to the annular tracks $w'$, $w'$, as shown in Figs. 1 and 20,—it being understood that that is the relation of parts attained when the eccentric disk $e$, is made to assume the position shown in Fig. 2, as aforesaid, with its greater radius exerted against the actuating cable $a$,—the attachment between the switch drums $s$, $s$, and said actuating cable $a$, being so timed as to effect this result. Conversely, and for a similar reason, when the lesser radius $e^4$, is positioned against the actuating cable $a$, as in Fig. 4, the said actuating cable $a$, will be contracted in length,—what would otherwise be the slack of the cable $a$, being taken up and compensated for by said tension devices $v$, $v'$; and this corresponds to the retracted position of the rotors (shown in dotted lines in Fig. 20) so that the rotors R, are not under tension when so retracted.

The two elastic resilient tension devices $v$, $v'$, may be of like construction, that shown in Fig. 6, answering for both, except that the device $v'$, interposed in the extreme rear strand of the actuating cable $a$, is preferably longer and of greater resistive strength than the one $v$, similarly interposed in the other or inner rear strand of said actuating cable $a$. Thus each may consist of a coiled spring $q$, inclosed in a tube $v^x$, and interposed between a stationary part and a movable shoulder $q'$, to which is attached a hook rod $a'$, extending through one end of the tube $v^x$, the other end of the said tube $v^x$, being attached to a screw $a^2$, engaging with a turn buckle $a^3$, swivel-connected to the cable $a$, the hook rod $a'$, being also connected with the cable $a$, as shown in Fig. 1. By the use of the turn buckle $a^3$, or equivalent mechanical expedient, the operative tension of the device may be adjusted with accuracy according to requirements.

The eccentric disk $e$, and consequently the actuating cable $a$, are operated and controlled manually, either by foot or hand lever, preferably the latter as shown,—said lever L, being provided with a latch $l'$, actuated by a push rod $l^2$, against the resistance of a spring $l^3$, as will be seen by reference more particularly to Fig. 4,—the said latch lever $l'$, acting in conjunction with the fixed latch shoulder $f^3$, on the bracket $f^2$. Thus, supposing the rotors R, to be retracted as illustrated in dotted lines in Fig. 20, with the short radius arc $e^4$, of the eccentric $e$, in evidence, and the control lever L, in the position shown in Fig. 4, if it is desired to place the rotors R, in operative relation to the wheels $w$, the rod $l^2$, is depressed against the resistance of the spring $l^3$, thereby rocking the latch $l'$, so that it is released from the latch shoulder $f^3$, in which relationship it has been held by the weight of the retracted rotors, acting through their switch drums $s$, and the actuating cable $a$. Then the lever L, is pulled back into the position shown in Fig. 2, causing the segmental rack $l$, to rotate the pinion $e^2$, sufficiently to bring the greater radius arc $e^3$, of the eccentric disk $e$, to the fore, and advancing the forward bight of the actuating cable thereon sufficiently to partially rotate the switch arms $s^2$, $s^2$, and cause the switch arms to lower the rotors R, R, into operative position as in Figs. 1 and 20, at the same time contracting the springs $q$, in the elastic resilient tension devices $v$, $v'$, and causing the more powerful one $v'$, to thrust the rotors R, toward the wheels $w$, $w$, with the rims of their rotor disks in close frictional contact with the annular tracks $w'$, $w'$, on said wheels. The travel of the rotor disks over said annular tracks $w'$, $w'$, causes sufficient back strain on the forward lower strand of the actuating cable $a$, to hold the latch lever $l'$, in contactual engagement with the back of the stationary latch shoulder as shown in Fig. 2, thereby sustaining the lever L, and eccentric disk $e$, in this prescribed positive operative position,—as distinguished from the negative or inoperative position shown in Fig. 4.

Under these operative conditions, and while traveling over a smooth road, the tension devices $v$, $v'$, counterbalance each other. If however excess of resistance is encountered by one wheel as compared with that encountered by the other, the stronger tension device $v'$, immediately compensates therefor by holding both rotors to their work, and by counteracting any tendency to back pressure that might otherwise be imparted by the switch arms $s^2$, $s^2$, and gears $s^3$, $s^3$, to the switch drums $s$, $s$.

These tension devices $v$, $v'$, also enable us to operate both rotors R, R, simultaneously by means of a single cable in conjunction with the eccentric disk $e$, and single manipulating lever L, which is a great practical advantage for obvious reasons. Another important factor in attaining this result is the provision of the switch drums $s$, $s$, and accessories, whereby the switch gearing is isolated and shielded from dust and dirt, and possible contact with extraneous objects,—the switch drums being self contained and self protecting in this respect,—and adapted to effect two different motions simultaneously, *i. e.*, the raising or lowering of the rotors and their substantial reversal in position, as illustrated in Fig. 20, of the drawings. In this connection it is to be understood that the two switching devices are practically of like construction except that the fixed segmental gears $d^4$, are reversed in position, so as to actuate the switch arms $s^2$, and gears $s^3$, $s^3$, in opposite directions.

From the foregoing it will be seen that our twin anti-skid rotors, when not desired for actual use may be quickly, conveniently, and simultaneously retracted and held out of operative relationship with their respective wheels, and as quickly positioned operatively with relation thereto by means of a single manually operated lever.

Thus it is not necessary, as the case of ordinary anti-skid tire chains, to stop the car in order to apply them to the wheel treads, as our frictional deterrents $m$, $m$, are always ready for instant use. The economy in time and labor thus effected is obvious when it is considered that it takes fifteen or twenty minutes to apply the ordinary anti-skid chains to the rear wheels of an auto; that they are usually applied under disagreeable conditions of road and weather; that the chauffeur has to leave his seat for the purpose; that such chains have to be taken from a place of storage, dragged to the rear wheels, and cannot be applied thereto without the exercise of considerable time and patience; and that the operation of removing them from the wheel tires is about as arduous and disagreeable as their application thereto. Furthermore, our anti-skid apparatus, as herein set forth is obviously an emergency appliance, being applicable for use as readily and quickly as the car brake itself, and being much more effective than the brake of the car in counteracting lateral slip or skid.

What we claim as our invention and desire to secure by Letters Patent is,

1. In anti-skid mechanism, a rotor of the character designated formed with a contact disk having a frictional deterrent holder formed with a countersunk socket having a contracted entrance, and in combination therewith a frictional deterrent formed with a coupling pin having a head adapted to fit in said socket and a shank portion adapted to be passed through said contracted entrance to the countersunk socket, for the purpose described.

2. In anti-skid mechanism, a rotor of the character designated formed with a contact disk having a frictional deterrent holder formed with a countersunk socket having a contracted entrance, and in combination therewith a frictional deterrent formed with a coupling pin having a head adapted to fit in said socket and a shank portion adapted to be passed through said contracted entrance to the countersunk socket, together with spring means for detachably securing said coupling pin to said holder, for the purpose described.

3. In anti-skid mechanism, a rotor of the character designated formed with a contact disk having a series of deterrent holders each formed with a countersunk socket having a contracted entrance, and in combination therewith a series of frictional deterrents each formed with a coupling pin having a head adapted to fit into any of said sockets and a shank portion adapted to be passed through any of said contracted entrances to said countersunk sockets, for the purpose described.

4. In anti-skid mechanism, a rotor of the character designated formed with a contact disk having a series of deterrent holders each formed with a countersunk socket having a contracted entrance, and in combination therewith a series of frictional deterrents each formed with a coupling pin having a head adapted to fit into any of said sockets and a shank portion adapted to be passed through any of said contracted entrances to said countersunk sockets, together with spring means for detachably securing said coupling pins to said holders, for the purpose described.

5. In anti-skid mechanism, a rotor of the character designated formed with a contact disk having a frictional deterrent holder formed with a countersunk socket having a contracted entrance, and in combination therewith a frictional deterrent formed with a coupling pin having a head adapted to fit in said socket and a shank portion adapted to be passed through said contracted entrance to said socket, a coiled spring articularly attached to said coupling pin, and a flexible deterrent member articularly attached to said coiled spring, for the purpose described.

6. In anti-skid mechanism, a rotor of the character designated formed with a contact disk having a series of frictional deterrent holders each formed with a countersunk socket having a contracted entrance, and in combination therewith a series of frictional deterrents each comprising a coupling pin having a head adapted to fit into any of said sockets and a shank portion adapted to be passed through any of said contracted entrances to said countersunk sockets, a coiled spring articularly connected to said coupling pin, and a flexible deterrent member articularly attached to said coiled spring, for the purpose described.

7. Anti-skid mechanism of the character designated, comprising a rotor having a disk for contactual engagement with an annular track on a drive wheel, flexible frictional deterrents articularly attached to said contact disk, a switch arm to which said rotor is rigidly secured, said switch arm being mounted on a rotatable part and having a gear meshing with a segmental rack on a fixed part, and means for rotating said rotatable part, for the purpose set forth.

8. Anti-skid mechanism of the character designated, comprising a rotor having a disk for contactual engagement with an annular track on a drive wheel, flexible frictional deterrents articularly attached to said contactual disk, a switch arm to which said rotor is rigidly secured, said switch arm being mounted on a rotatable drum and having a gear meshing with a segmental rack on a fixed drum plate, and means for rotating said drum, for the purpose set forth.

9. Anti-skid mechanism of the character designated, comprising two rotors, each having a disk for contactual engagement with an annular track on an adjacent drive wheel, each of said contactual disks having flexible frictional deterrents articularly attached thereto, each rotor being rigidly secured to its own switch arm, said switch arms each mounted on a rotatable part and having a gear meshing with a fixed part, and means for rotating both of said rotatable parts simultaneously, for the purpose described.

10. Anti-skid mechanism of the character designated, comprising twin rotors, each having a disk for contactual engagement with an annular track on an adjacent drive wheel, each of said contactual disks having flexible frictional deterrents articularly attached thereto, each rotor being rigidly secured to its own switch arm, said switch arms each mounted on its own rotatable drum and having a gear meshing with a segmental rack on a fixed drum plate, and means for rotating both of said drums simultaneously, for the purpose described.

11. Anti-skid mechanism of the character designated, comprising twin rotors, each having a disk for contactual engagement with an annular track on an adjacent drive wheel, each of said contactual disks having flexible frictional deterrents articularly attached thereto, each rotor being rigidly secured to its own switch arm, said switch arms each mounted on its own rotatable drum and having a gear meshing with a segmental rack on a fixed drum plate, an actuating cable to which said drums are attached, and means for moving said actuating cable manually and alternately in opposite directions, for the purpose described.

12. Anti-skid mechanism of the character designated, comprising twin rotors, each having a disk for contactual engagement with an annular track on an adjacent drive wheel, each of said contactual disks having flexible frictional deterrents articularly attached thereto, each rotor being rigidly secured to its own switch arm, said switch arms each mounted on its own rotatable drum and having a gear meshing with a segmental rack on a fixed drum plate, an endless actuating cable to which said drums are independently attached, a rotatable disk to which said actuating cable is also attached, and means for rotating said disk alternately in opposite directions, for the purpose described.

13. Anti-skid mechanism of the character designated, comprising twin rotors, each having a disk for contactual engagement with an annular track on an adjacent drive wheel, each of said contactual disks having flexible frictional deterrents articularly attached thereto, each rotor being rigidly secured to its own switch arm, said switch arms each mounted on its own rotatable drum and having a gear meshing with a segmental rack on a fixed drum plate, an endless actuating cable to which said drums are independently attached, an eccentric disk to which said actuating cable is also attached, and means for rotating said eccentric disk alternately in opposite directions, for the purpose described.

14. Anti-skid mechanism of the character designated, comprising twin rotors, each having a disk for contactual engagement with an annular track on an adjacent drive wheel, each of said contactual disks having flexible frictional deterrents articularly attached thereto, each rotor being rigidly secured to its own switch arm, said switch arms each mounted on its own rotatable drum and having a gear meshing with a segmental rack on a fixed drum plate, an endless actuating cable to which said drums are independently attached, elastic resilient means interposed in said actuating cable between the said drums, an eccentric disk to which said actuating cable is also attached, and means for rotating said eccentric disk alternately in opposite directions, for the purpose described.

15. Anti-skid mechanism of the character designated, comprising twin rotors, each having a disk for contactual engagement with an annular track on an adjacent drive wheel, each of said contactual disks having flexible frictional deterrents articularly attached thereto, each rotor being rigidly secured to its own switch arm, said switch arms each mounted on its own rotatable drum and having a gear meshing with a segmental rack on a fixed drum plate, an endless actuating cable to which said drums are independently attached, elastic resilient means interposed in said actuating cable between the said drums, an eccentric disk to which said actuating cable is also attached, a pinion rigidly connected with said eccentric disk, a lever controlled segmental gear meshing with said pinion, and means for limiting the motion of said control lever in either direction, for the purpose described.

16. Anti-skid mechanism of the character designated, comprising twin rotors, each having a disk for contactual engagement with an annular track on an adjacent drive wheel, each of said contactual disks having flexible frictional deterrents articularly attached thereto, each rotor being rigidly secured to its own switch arm, said switch arms each mounted on its own rotatable drum and having a gear meshing with a segmental rack on a fixed drum plate, an endless cable to which said drums are independently attached, idler pulleys each engaging a separate rear strand of said endless actuating cable, elastic resilient devices interposed in each of said rear strands of the cable between the idler pulleys and the drums, one of said elastic resilient devices being of greater tensile resistance than the other, an eccentric disk to which said actuating cable is also attached, a pinion rigidly connected with said eccentric disk, a lever-controlled segmental gear meshing with said pinion, and means for limiting the motion of said control lever in either direction, for the purpose described.

HAROLD THORNE.
NICHOLAS D. MANOILOVICH.

Witnesses:
  Geo. Wm. Miatt,
  Dorothy Miatt.